United States Patent
Clark et al.

(10) Patent No.: US 12,492,648 B2
(45) Date of Patent: Dec. 9, 2025

(54) MODULATED AIR-COOLED HEAT EXCHANGER FOR HYBRID ELECTRIC THERMAL MANAGEMENT SYSTEMS

(71) Applicant: RTX Corporation, Farmington, CT (US)

(72) Inventors: Thomas E. Clark, Wells, ME (US); Bryan Kupferman, Norwalk, CT (US); Ethan K. Stearns, Lebanon, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/667,722

(22) Filed: May 17, 2024

(65) Prior Publication Data
US 2025/0354500 A1    Nov. 20, 2025

(51) Int. Cl.
*F01D 25/12* (2006.01)
*F01D 17/12* (2006.01)

(52) U.S. Cl.
CPC ............. *F01D 25/12* (2013.01); *F01D 17/12* (2013.01); *F05D 2220/36* (2013.01); *F05D 2260/213* (2013.01)

(58) Field of Classification Search
CPC .......... F02K 3/115; F01D 25/12; F01D 17/12; F05D 2260/213; F16K 11/076; F16K 5/04; F16K 3/26
See application file for complete search history.

(56) References Cited

U.S. PATENT DOCUMENTS

| | | | | |
|---|---|---|---|---|
| 353,227 | A * | 11/1886 | Kuyl et al. | F16K 5/106 |
| | | | | 137/601.16 |
| 5,123,242 | A * | 6/1992 | Miller | F28F 27/02 |
| | | | | 60/39.83 |
| 6,539,899 | B1 * | 4/2003 | Piccirilli | F01P 7/167 |
| | | | | 123/41.1 |
| 7,765,788 | B2 | 8/2010 | Schwarz | |
| 7,886,520 | B2 | 2/2011 | Stretton et al. | |
| 9,683,678 | B2 * | 6/2017 | Army, Jr. | B64D 13/00 |
| 9,790,893 | B2 | 10/2017 | Snyder | |
| 10,294,822 | B2 * | 5/2019 | Caruel | B64D 33/10 |
| 11,591,965 | B2 | 2/2023 | Wolfe et al. | |
| 2012/0272658 | A1 * | 11/2012 | Murphy | F02C 7/185 |
| | | | | 165/96 |
| 2015/0052907 | A1 | 2/2015 | Murphy | |

(Continued)

FOREIGN PATENT DOCUMENTS

| | | | |
|---|---|---|---|
| CN | 110486490 A * | 11/2019 | ............ F16K 11/076 |
| EP | 3741678 A1 | 11/2020 | |

(Continued)

OTHER PUBLICATIONS

Detloff, C. What are Plug Valves?—Empowering Pumps and Equipment . Sep. 12, 2016. Accessed from: https://empoweringpumps.com/what-are-plug-valves/ (Year: 2016).*

(Continued)

*Primary Examiner* — Topaz L. Elliott

(57) ABSTRACT

A gas turbine engine includes a fan section, a heat exchanger, and inlet door. The fan section is configured to generate an airflow. The heat exchanger is configured to transfer heat from a thermal management system to the airflow. The inlet door is configured to modulate the airflow to the heat exchanger.

20 Claims, 3 Drawing Sheets

(56) References Cited

U.S. PATENT DOCUMENTS

| | | | |
|---|---|---|---|
| 2017/0045155 A1* | 2/2017 | Army, Jr. | B64D 13/00 |
| 2022/0010883 A1* | 1/2022 | Willey | F02D 35/00 |
| 2025/0052329 A1* | 2/2025 | Nadji | F16K 5/188 |
| 2025/0084926 A1* | 3/2025 | Herkimer | F16K 11/076 |

FOREIGN PATENT DOCUMENTS

| | | | | |
|---|---|---|---|---|
| FR | 2905672 A1 | | 3/2008 | |
| GB | 191218524 A | * | 7/1913 | |
| JP | 2004027395 A | * | 1/2004 | D03D 47/32 |
| JP | 7354597 B2 | * | 10/2023 | |

OTHER PUBLICATIONS

European Search Report dated Sep. 29, 2025, in connection with European Application No. 25177354.5, 8 pages.

\* cited by examiner

MODULATED AIR-COOLED HEAT
EXCHANGER FOR HYBRID ELECTRIC
THERMAL MANAGEMENT SYSTEMS

TECHNICAL FIELD

This disclosure relates generally to gas turbine engine devices and processes. More specifically, this disclosure relates to a modulated air-cooled heat exchanger for hybrid electric thermal management systems.

BACKGROUND

Industry-wide design trends for gas turbine engines have included a general push towards incorporating hybrid electric systems, which use high-power motor generators and motor controllers integrated into gas turbine aircraft engines. However, this presents new challenges associated with the management of system waste heat. Classical approaches of increasing the size of a heat exchangers to better reject system waste heat in low air-flow operating conditions may solve the problem of increased system heat management capacity; however this typically is not a viable solution due to the increased drag losses incurred by the large heat exchangers at cruise.

SUMMARY

This disclosure provides a modulated air-cooled heat exchanger for hybrid electric thermal management systems.

In a first embodiment, an apparatus includes a fan section, a heat exchanger, and inlet door. The fan section is configured to generate an airflow. The heat exchanger is configured to transfer heat from a thermal management system to the airflow. The inlet door is configured to modulate the airflow to the heat exchanger.

In certain embodiments, the inlet door includes a housing and a cylinder with a main flow path and a modulated flow path.

In certain embodiments, the main flow path includes first and second openings; and the modulated flow path includes a third opening.

In certain embodiments, the inlet door operates in a fully open state with the first opening exposed outside of the housing, the second opening exposed to an inlet duct of the heat exchanger, and the third opening is blocked by the housing.

In certain embodiments, the third opening is fully blocked by the housing.

In certain embodiments, the inlet door operates in a fully modulated state with the first opening partially exposed outside of the housing, the second opening partially exposed outside of the housing, and the third opening exposed to an inlet duct of the heat exchanger.

In certain embodiments, the inlet door operates in a partially modulated state with the first opening partially exposed outside of the housing and the third opening exposed to an inlet duct of the heat exchanger.

In certain embodiments, the second opening is fully blocked by the housing.

In certain embodiments, the apparatus further includes a modulation control actuator configured to control a rotation of the cylinder in the housing for the modulation of the airflow.

In certain embodiments, the apparatus further includes a modulation control actuator configured to control the modulation of the airflow by the inlet door.

In a second embodiment, a gas turbine engine includes a thermal management system, a fan section, a heat exchanger, and inlet door. The thermal management system is configured to remove heat from heat-generating components of the gas turbine engine. The fan section is configured to generate an airflow. The heat exchanger is configured to transfer heat from a thermal management system to the airflow. The inlet door is configured to modulate the airflow to the heat exchanger.

In certain embodiments, the inlet door includes a housing and a cylinder with a main flow path and a modulated flow path.

In certain embodiments, the main flow path includes first and second openings; and the modulated flow path includes a third opening.

In certain embodiments, the inlet door operates in a fully open state with the first opening exposed outside of the housing, the second opening exposed to an inlet duct of the heat exchanger, and the third opening is blocked by the housing.

In certain embodiments, the third opening is fully blocked by the housing.

In certain embodiments, the inlet door operates in a fully modulated state with the first opening partially exposed outside of the housing, the second opening partially exposed outside of the housing, and the third opening exposed to an inlet duct of the heat exchanger.

In certain embodiments, the inlet door operates in a partially modulated state with the first opening partially exposed outside of the housing and the third opening exposed to an inlet duct of the heat exchanger.

In certain embodiments, the second opening is fully blocked by the housing.

In certain embodiments, the gas turbine engine further includes a modulation control actuator configured to control a rotation of the cylinder in the housing for the modulation of the airflow.

In certain embodiments, the gas turbine engine further includes a modulation control actuator configured to control the modulation of the airflow by the inlet door.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 3B, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

Hybrid electric thermal management systems may include sensitive power electronics and high-power motor-generators. Power electronics may be limited to coolant temperatures below 100° C., for example. The low system coolant temperatures drive the need for large heat exchangers, even at moderate power levels (~200 KW) of hybridization power functions. The large heat exchangers incur engine weight penalties, and large nacelle drag loss penalties at cruise. The hybrid electric thermal management system is typically limited at maximum hot day (MHD) ground idle conditions where fan mass flow is both limited and at low-pressure ratio across the heat exchanger.

Heat exchangers may be sized to a ground idle sizing point. Because of this, it is desirable to reduce loss penalties at cruise where the heat exchanger is over-sized, which may be accomplished via modulation of fan air entering the heat exchanger.

Figure 1:
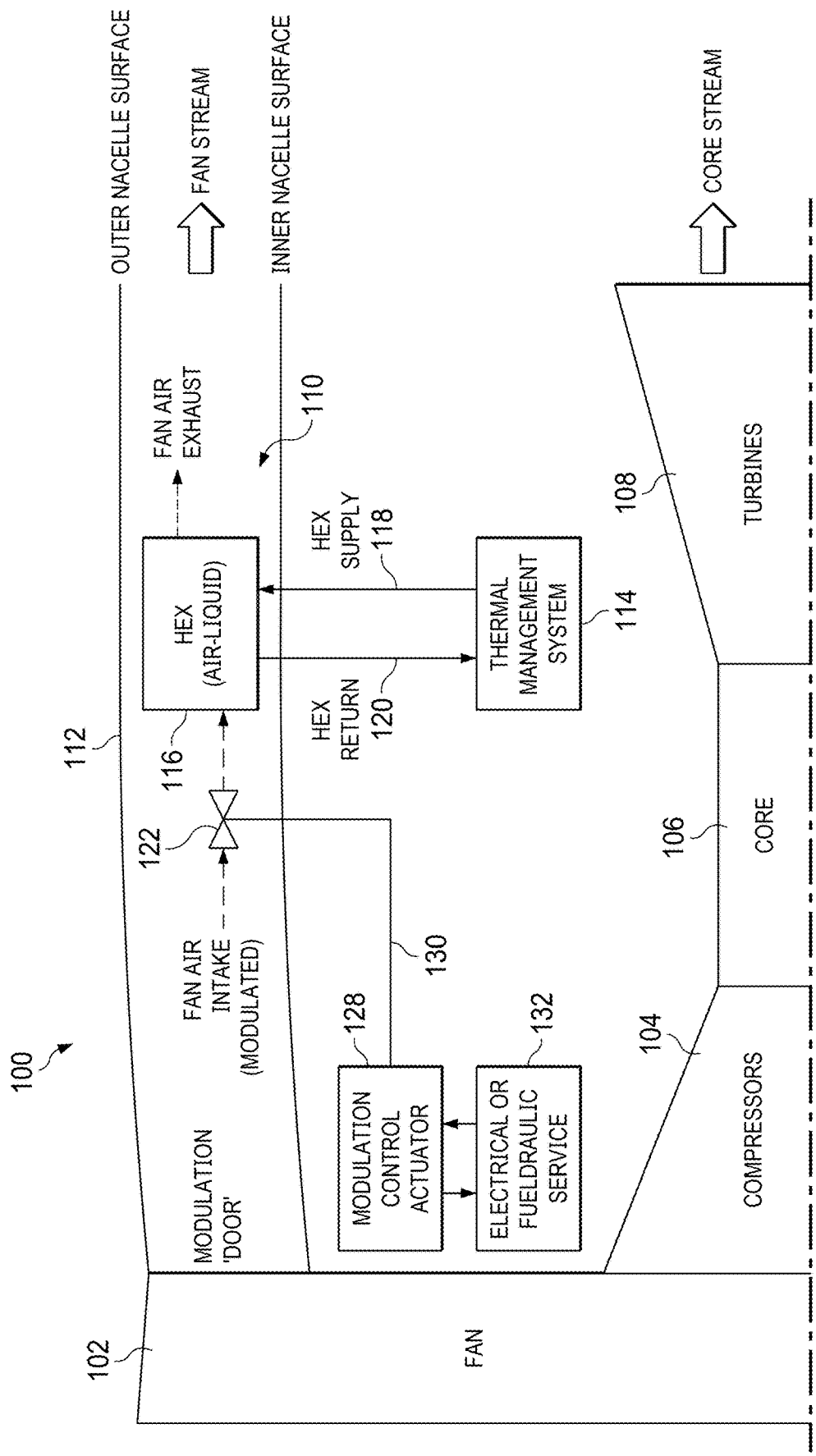
FIG. 1 illustrates an example gas turbine engine in accordance with this disclosure.
Figure 2A:
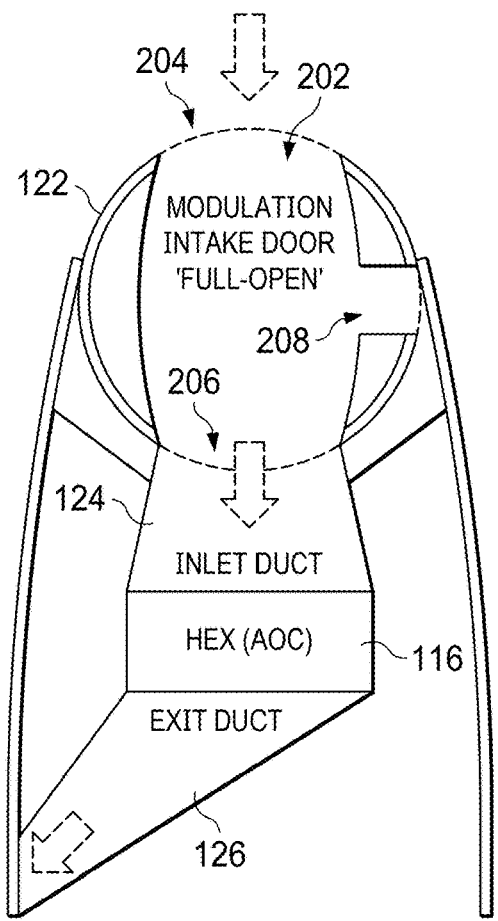
FIGS. 2A and 2B illustrate an example configuration for a modulated inlet door and heat exchanger in accordance with this disclosure.
Figure 2B:
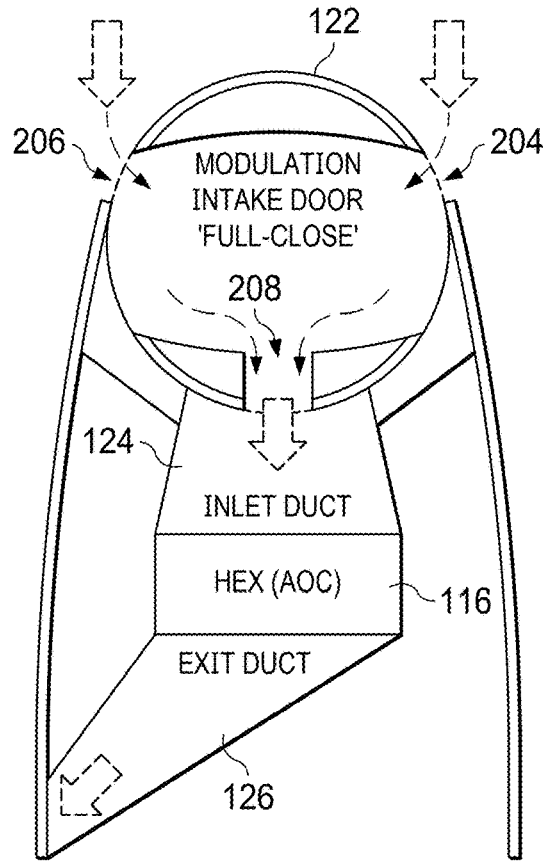
Figure 3A:
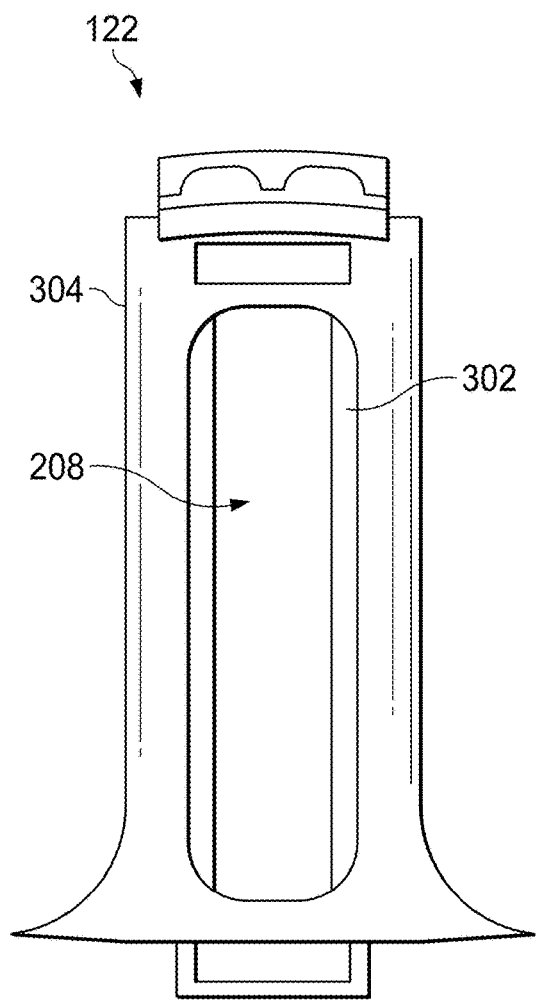
FIGS. 3A and 3B illustrate an example modulated inlet door in accordance with this disclosure.
Figure 3B:
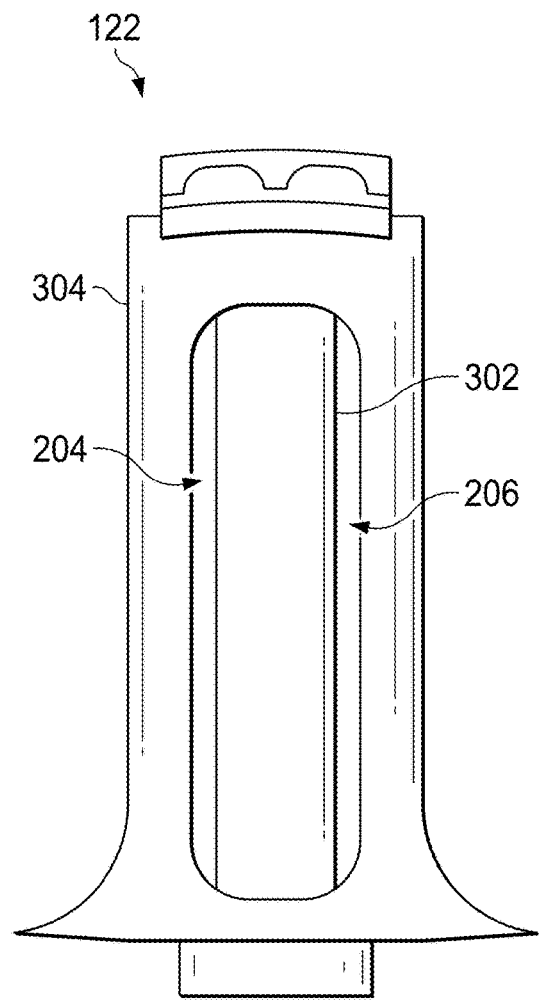

FIG. 1 illustrates an example gas turbine engine 100 in accordance with this disclosure. FIGS. 2A and 2B illustrate an example configuration for a modulated inlet door and heat exchanger in accordance with this disclosure. FIGS. 3A and 3B illustrate an example modulated inlet door in accordance with this disclosure.

As shown in FIG. 1, gas turbine engine 100 is disclosed as a turbofan engine that generally incorporates a fan section 102, a compressor section 104, a combustor section 106, and a turbine section 108. The fan section 102 drives air along a bypass flow path 110 in a bypass duct defined within a nacelle 112, while the compressor section 104 drives air along a core flow path for compression and communication into the combustor section 106 then expansion through the turbine section 108. Although described below as a two-shaft turbofan gas turbine engine in the disclosed non-limiting embodiment, it should be understood that the concepts described herein are not limited to use with two-shaft turbofans as the teachings may be applied to other types of turbine engines, such as turboshaft engines, prop fan or other engines including three-shaft architectures, direct drive architectures, and/or the like. Alternate propulsors to an enclosed fan section 102 may be a propellor or open-rotor fan.

The gas turbine engine 100 generally includes a low-speed shaft and a high-speed shaft mounted for rotation about an engine static structure via several bearing systems. It should be understood that various bearing systems at various locations may be provided.

The low-speed shaft generally includes an inner shaft that interconnects a fan (in the fan section 102), a first (or low) pressure compressor (in the compressor section 104), and a first (or low) pressure turbine (in the turbine section 108). The low-speed shaft may be connected to the fan through a speed change mechanism (such as a gear box). The high-speed shaft includes an outer shaft that interconnects a second (or high) pressure compressor (in the compressor section 104) and a second (or high) pressure turbine (in the turbine section 108). In some examples, a combustor (in the combustor section 106) may be arranged in the gas turbine engine 100 between the high-pressure compressor and the high-pressure turbine. In some examples, a mid-turbine frame of the engine static structure may be arranged generally between the high-pressure turbine and the low-pressure turbine. The mid-turbine frame further supports bearing systems within the turbine section 108. The low-speed shaft and the high-speed shaft are concentric and rotate via bearing systems about the engine central longitudinal axis, which may be collinear with the longitudinal axes of the low-speed shaft and the high-speed shaft. The low-pressure compressor, the low-pressure turbine, the high-pressure compressor, and the high-pressure compressor may contain multiple stages.

The core airflow can be compressed by the low-pressure compressor then the high-pressure compressor, mixed and burned with fuel in the combustor, then expanded over the high-pressure turbine and low-pressure turbine. The turbines may rotationally drive the respective low-speed shaft and high-speed shaft in response to the expansion. It will be appreciated that each of the positions of the fan section 102, compressor section 104, combustor section 106, turbine section 108, and gear box may be varied. For example, gear box may be located aft of combustor section 106 or even aft of turbine section 108, and fan section 102 may be positioned forward or aft of the location of gear box.

The gas turbine engine 100 can include a thermal management system 114 that is used to draw heat from different components that are operating within the gas turbine engine 100 including the hybrid electric motor generators and power electronics. The thermal management system 114 can be fluidly connected to a heat exchanger 116 positioned within the nacelle 112 in the bypass flow path 110. A fluid medium can be used within the thermal management system 114 and the heat exchanger 116 to transfer heat. The fluid medium can draw heat from components through the thermal management system 114. The heated fluid medium can be routed from the heat management system 114 to the heat exchanger 116 through a heat exchanger supply 118. The fluid medium can transfer the heat to the fan air passing through the nacelle 112. The cooled fluid medium can be routed from the heat exchanger 116 to the hybrid electric thermal management system 114 through a heat exchanger return 120. The fluid medium can be a gas, such as air, or a liquid. Alternatively, the fluid medium may be two-phase comprising both gas and liquid.

The fan air can be modulated prior to the heat exchanger 116. Modulation can be achieved by reducing the fan mass flow rate through the heat exchanger 116 and reducing the nacelle drag loss pressure term by dynamically allocating the minimum flow rate needed by the hybrid electric thermal management system. Fan-air modulation can be achieved by rotation of an inlet door 122 that controls the inlet area of an inlet duct 124 (FIGS. 2A and 2B) to the heat exchanger 116. The exhaust duct exit 126 can be fixed for simplicity. Modulation may be controlled by controller software, such as full authority digital engine control (FADEC) or electronic engine control (EEC) software, via continuous or discrete control of fan mass flow. The benefits include modulation of a hybrid electric thermal management system heat exchanger (AOC) enables reduced nacelle drag losses at cruise with minimal overall weight impact at the engine level. Other benefits include adaptively tailoring modulation of the AOC (continuous control) to mission needs (MHD ground idle, cold day ground idle, etc.).

The modulation of the inlet door 122 can be adjusted by a modulation control actuator 128 using kinematic linkage 130 (FIG. 1). Non-limiting examples of kinematic linkage 130 can include a scotch yoke, two bar arrangements, and/or the like. The modulation control actuator 128 can be connected to an electrical or fluidraulic (fuel hydraulic) service 132. The electrical or fluidraulic service 132 can provide the control for the actuator 128, whether as electrical signal or hydraulic fluids.

To modulate the fan air, the inlet door 122 can be rotated between a fully open state, shown in FIG. 2A, and a fully modulated state, as shown in FIG. 2B. The inlet door may be rotated to any partial state between fully open and fully modulated.

The inlet door 122 can be adjusted to control the flow of fan air through the heat exchanger 116. The inlet door 122 includes a cylinder 302 and a housing 304. The cylinder 302 can rotate within the housing 304 by means of the modulation control actuator 128. While the inlet door 122 is illustrated as a cylinder 302 with a main flow path 202, which includes a first opening 204, a second opening 206, and a third opening 208, the inlet door 122 can be formed in any shape with more or less openings. In the fully open state, the fan air flow through the first opening 204 through the second opening 206 into the inlet duct 124, and the third opening 208 is blocked by the housing 304 of the inlet door 122. In the fully modulated state or the fully closed state, the first opening 204 and the second opening 206 are partially blocked by the housing 304, and the third opening 208 is opened to the inlet duct 124.

Although FIGS. 1-3B illustrate an example gas turbine engine 100 in accordance with this disclosure, various changes may be made to FIG. 1. For example, the various components in FIGS. 1-3B may be combined, further subdivided, replicated, omitted, or rearranged and additional components may be added according to particular needs. In particular, the inlet door 122 may have other arrangements and flow paths.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a fan section configured to generate an airflow;
   a heat exchanger configured to transfer heat from a thermal management system to the airflow; and
   an inlet door configured to modulate the airflow to the heat exchanger,
   wherein the inlet door includes a housing and is configured to operate in a fully modulated state with a first opening partially exposed outside of the housing, a second opening partially exposed outside of the housing, and a third opening exposed to an inlet duct of the heat exchanger.

2. The apparatus of claim 1, wherein the inlet door includes
   a cylinder with a main flow path and a modulated flow path.

3. The apparatus of claim 2, wherein:
   the main flow path includes the first and second openings; and
   the modulated flow path includes the third opening.

4. The apparatus of claim 3, wherein the inlet door is further configured to operate in a fully open state with the first opening exposed outside of the housing, the second opening exposed to an inlet duct of the heat exchanger, and the third opening blocked by the housing.

5. The apparatus of claim 4, wherein, when operating in the fully open state, the third opening is fully blocked by the housing.

6. The apparatus of claim 3, wherein the inlet door is further configured to operate in a partially modulated state with the first opening partially exposed outside of the housing and the third opening exposed to an inlet duct of the heat exchanger.

7. The apparatus of claim 6, wherein, when operating in the partially modulated state, the second opening is fully blocked by the housing.

8. The apparatus of claim 2, further comprising:
   a modulation control actuator configured to control a rotation of the cylinder in the housing for the modulation of the airflow.

9. The apparatus of claim 1, further comprising:
   a modulation control actuator configured to control the modulation of the airflow by the inlet door.

10. The apparatus of claim 9, wherein to control the modulation of the airflow by the inlet door, the modulation control actuator is configured to adjust a position of the inlet door via a kinematic linkage.

11. A gas turbine engine comprising:
    a thermal management system configured to remove heat from heat-generating components of the gas turbine engine;
    a fan section configured to generate an airflow;
    a heat exchanger configured to transfer the heat from the thermal management system to the airflow; and an inlet door configured to modulate the airflow to the heat exchanger, wherein the inlet door includes a housing and is configured to operate in a fully modulated state with a first opening partially exposed outside of the housing, a second opening partially exposed outside of the housing, and a third opening exposed to an inlet duct of the heat exchanger.

12. The gas turbine engine of claim 11, wherein the inlet door includes a cylinder with a main flow path and a modulated flow path.

13. The gas turbine engine of claim 12, wherein:

the main flow path includes the first and second openings; and the modulated flow path includes the third opening.

14. The gas turbine engine of claim 13, wherein the inlet door is further configured to operate in a fully open state with the first opening exposed outside of the housing, the second opening exposed to an inlet duct of the heat exchanger, and the third opening blocked by the housing.

15. The gas turbine engine of claim 14, wherein, when operating in the fully open state, the third opening is fully blocked by the housing.

16. The gas turbine engine of claim 13, wherein the inlet door is further configured to operate in a partially modulated state with the first opening partially exposed outside of the housing and the third opening exposed to an inlet duct of the heat exchanger.

17. The gas turbine engine of claim 16, wherein, when operating in the partially modulated state, the second opening is fully blocked by the housing.

18. The gas turbine engine of claim 12, further comprising:

a modulation control actuator configured to control a rotation of the cylinder in the housing for the modulation of the airflow.

19. The gas turbine engine of claim 11, further comprising:

a modulation control actuator configured to control the modulation of the airflow by the inlet door.

20. The gas turbine engine of claim 19, wherein to control the modulation of the airflow by the inlet door, the modulation control actuator is configured to adjust a position of the inlet door via a kinematic linkage.

* * * * *